(12) United States Patent
Kouda et al.

(10) Patent No.: US 7,994,677 B2
(45) Date of Patent: *Aug. 9, 2011

(54) STATOR FOR ROTARY ELECTRIC MACHINE, AND ROTARY ELECTRIC MACHINE USING THE STATOR

(75) Inventors: Shinji Kouda, Kariya (JP); Shinichi Ogawa, Oobu (JP); Akiya Shichijoh, Yatomi (JP); Takeo Maekawa, Okazaki (JP)

(73) Assignee: Denso Corporation, Kariya (JP)

( * ) Notice: Subject to any disclaimer, the term of this patent is extended or adjusted under 35 U.S.C. 154(b) by 37 days.

This patent is subject to a terminal disclaimer.

(21) Appl. No.: 12/323,852

(22) Filed: Nov. 26, 2008

(65) Prior Publication Data

US 2009/0146523 A1  Jun. 11, 2009

(30) Foreign Application Priority Data

Nov. 26, 2007  (JP) ................................ 2007-305104

(51) Int. Cl.
*H02K 3/04* (2006.01)
*H02K 3/12* (2006.01)

(52) U.S. Cl. ........................................ 310/201; 310/207
(58) Field of Classification Search .................. 310/180, 310/184, 201, 203, 206–207
See application file for complete search history.

(56) References Cited

U.S. PATENT DOCUMENTS

| | | | |
|---|---|---|---|
| 5,936,326 A | 8/1999 | Umeda et al. | |
| 6,376,961 B2 | 4/2002 | Murakami et al. | |
| 6,794,785 B2 * | 9/2004 | Isogai et al. | 310/184 |
| 6,911,758 B2 | 6/2005 | Oohashi | |
| 6,979,926 B2 * | 12/2005 | Ogawa et al. | 310/180 |
| 7,337,525 B2 | 3/2008 | Ueda et al. | |
| 2004/0207282 A1 | 10/2004 | Ueda et al. | |
| 2007/0273237 A1 | 11/2007 | Shichijoh et al. | |
| 2008/0079328 A1 | 4/2008 | Shichijoh et al. | |

FOREIGN PATENT DOCUMENTS

| | | |
|---|---|---|
| JP | 11-285216 | 10/1999 |
| JP | 2002 176752 | 6/2002 |
| JP | 2003-018778 | 1/2003 |
| JP | 2004 088993 | 3/2004 |
| JP | 2004 320886 | 11/2004 |
| JP | 2004 350381 | 12/2004 |
| JP | 2007 318902 | 12/2007 |
| JP | 2008 113539 | 5/2008 |
| WO | WO 2008/108351 | 9/2008 |

* cited by examiner

*Primary Examiner* — Tran N Nguyen
(74) *Attorney, Agent, or Firm* — Nixon & Vanderhye PC

(57) ABSTRACT

A stator for a multiple-phase rotary electric machine is provided with a stator core with slots and a coil formed of a plurality of windings for individual phases. Each winding has slot-accommodated portions accommodated in different slots, turn portions connecting the slot-accommodated portions outside of the slots in an axial direction, and a return portion that connects two of the turn portions and changes a winding direction of the winding at given slots. The turn portions include specific turn portions which are the same in a circumferential position as the turn portion connected to one of the return portion. The first and second windings are jointed to each other via a joined portion disposed in a specific slot among the slots.

19 Claims, 17 Drawing Sheets

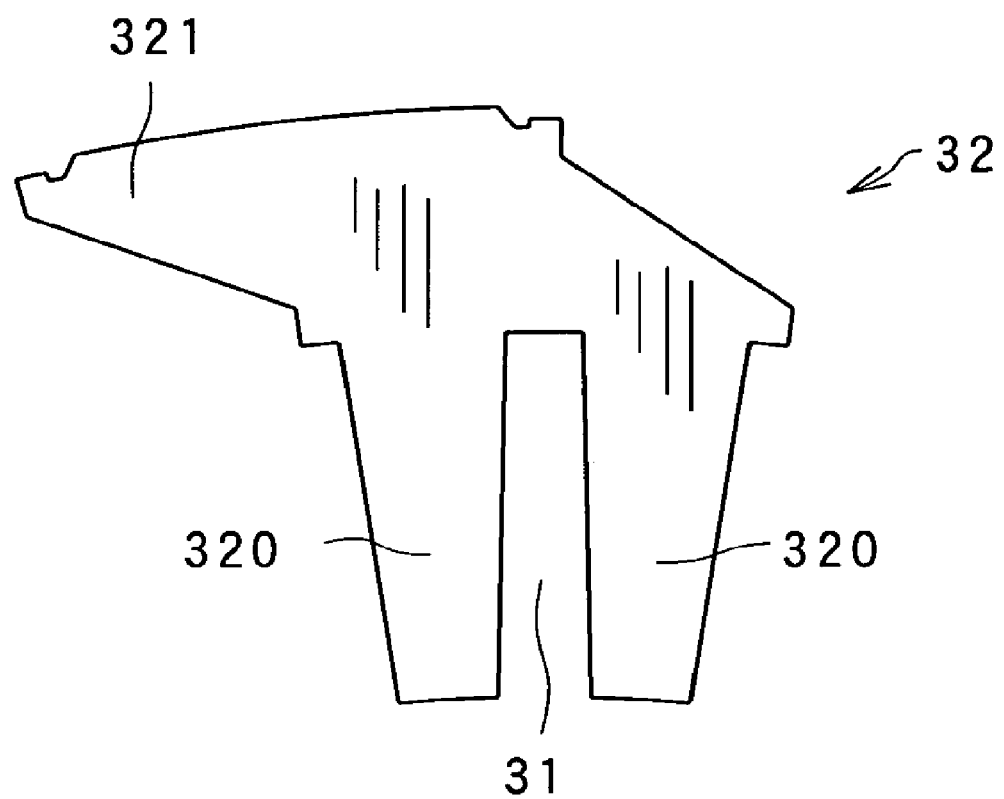

US 7,994,677 B2

STATOR FOR ROTARY ELECTRIC MACHINE, AND ROTARY ELECTRIC MACHINE USING THE STATOR

CROSS-REFERENCE TO RELATED APPLICATION

This application is based on and claims the benefit of priority from earlier Japanese Patent Application No. 2007-305104 filed Nov. 26, 2007, the description of which is incorporated herein by reference.

BACKGROUND OF THE INVENTION

1. Technical Field of the Invention

The present invention relates to a stator for rotary electric machine, and a rotary electric machine using the stator.

2. Related Art

Recently, there has been a demand for downsized and high-power rotary electric machines for use as electric motors or electric generators.

For example, in the case of rotary electric machines loaded on vehicles, the space for loading such a rotary electric machine has been more and more reduced, while the output thereof has been demanded to be more and more enhanced.

Various types of rotary electric machines have been in use. Some of such conventional rotary electric machines are disclosed in Japanese Patent Laid-Open Publication Nos. 2002-176752 and 2004-320886, for example.

Each of these literatures discloses a stator for rotary electric machine. The stator for rotary electric machine disclosed in each of these literatures has a coil formed of continuous windings.

In the rotary electric machines described in these literatures, three-phase stator winding is formed using twelve element wires. Accordingly, the stator is structured to have twenty-four element wire ends axially projected from the stator. Thus, when these element wire ends are connected, extra space is required in the axial direction of the stator, raising a problem of increasing the size of the stator in the axial direction.

SUMMARY OF THE INVENTION

The present invention has been made in light of the circumstances explained above, and has an object of providing a downsized stator, which will not deteriorate its performance when used for a rotary electric machine, and of providing a rotary electric machine using the stator.

In a first aspect of the stator for rotary electric machine of the invention, the first and second windings for each phase winding are joined at a slot-accommodated portion. Thus, the number of ends projected from the axial end face of the coil can be reduced in each phase winding, whereby the space required for connecting the ends of each phase winding of outside the coil can be reduced, thereby reducing the size of the coil. Also, since the joined portion is resultantly fixed in the slot, the joined ends of the two windings can be prevented from coming off from each other.

In a second aspect of the stator for rotary electric machine of the invention, the joined portion is provided at the return portion consisting of the slot-accommodated portions where the directions of winding are reversed. Thus, the two windings of the coil can be easily joined to each other.

In a third aspect of the stator for rotary electric machine of the invention, the metal conductors of the two windings are joined by welding, and thus the windings can be strongly joined to each other.

In a fourth aspect of the stator for rotary electric machine of the invention, the joined portion of the two windings is applied with insulation treatment, and thus the electrical insulation properties of the coil can be ensured.

In a fifth aspect of the stator for rotary electric machine of the invention, each of the turn portions is formed into a cranked shape to offset the radial positions of the turn portions from each other. Thus, when different stator windings are disposed in the adjacent slots, interference between the associated turn portions can be suppressed. As a result, the size of the coil can be reduced.

In a sixth aspect of the stator for rotary electric machine of the invention, each of the turn portions is formed into a staircase (stepwise) pattern to offset the axial positions of the turn portions from each other. Thus, when different stator windings are disposed in the adjacent slots, interference between the associated turn portions can be suppressed. As a result, the size of the coil can be reduced.

In a seventh aspect of the stator for rotary electric machine of the invention, each of the turn portions is formed into a staircase pattern in which the height of one step corresponds to the thickness of each of the wires of each phase winding, to permit the turn portions to be axially laid one on the other. Thus, when different stator windings are disposed in the adjacent slots, interference between the turn portions can be suppressed. As a result, the size of the coil can be reduced.

In an eighth aspect of the stator for rotary electric machine of the invention, the slot-accommodated portions of the windings for each phase winding are aligned depthwise in each slot (in the direction along the depth in each slot), whereby the magnetic characteristics produced in each phase winding can be enhanced.

In a ninth aspect of the stator for rotary electric machine of the invention, the return portion is located at the innermost periphery. Thus, the ends of the two windings that configure each phase winding are no longer located on the side of the inner periphery. Therefore, these ends are no longer permitted to cross over the axial end of the coil, thereby reducing the size of the coil.

In a tenth aspect of the stator for rotary electric machine of the invention, neither end of each of the two windings configuring each phase winding is permitted to cross over the axial end of the coil, thereby reducing the size of the coil.

According to another aspect, there is provided a rotary electric machine, wherein the rotary electric machine uses the stator configured to reduce the size of the coil. Thus, the size of the rotary electric machine can also be reduced.

BRIEF DESCRIPTION OF THE DRAWINGS

In the accompanying drawings:

FIG. 4 illustrates one of the segments configuring the core of the stator in the rotary electric machine according to the embodiment;

DETAILED DESCRIPTION OF THE PREFERRED EMBODIMENTS

With reference to the accompanying drawings, hereinafter will be described a stator for rotary electric machine and a rotary electric machine using the stator, according to an embodiment of the present invention.

Embodiment

Figure 1:
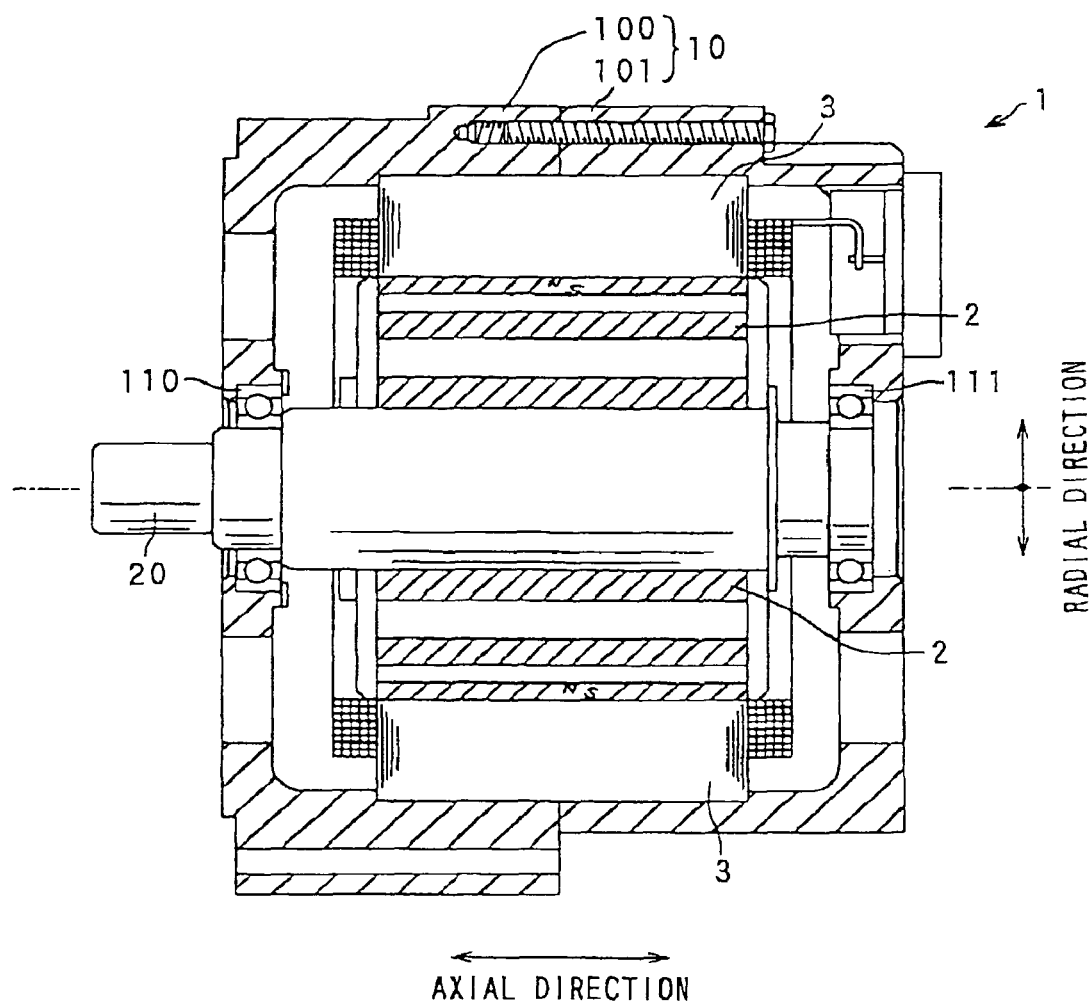
FIG. 1 is schematic diagram illustrating a rotary electric machine according to an embodiment of the present invention.

FIG. 1 is a schematic diagram illustrating a rotary electric machine according to the present embodiment. A rotary electric machine 1 according to the present embodiment includes: a housing 10 consisting of a pair of substantially cylindrical bottomed housing members 100 and 101 which are joined through openings thereof; a rotor 2 fixed to a rotary shaft 20 which is rotatably supported through bearings 110 and 111; and a stator 3 fixed to the housing 10 at a position in the housing 10, for enclosing the rotor 2.

The rotor 2 is produced as an inner rotor type in the present embodiment, but may be produced as an outer rotor type. The rotor 2 is provided with a plurality of alternately differentiated magnetic poles along the circumferential direction on the outer periphery thereof which faces the inner periphery of the stator 3. The number of magnetic poles of the rotor 2 is differentiated depending on the rotary electric machines, and thus the number is not intended to be limited. The rotor used in the present embodiment has eight poles (four N-poles and four S-poles).

Figure 2:
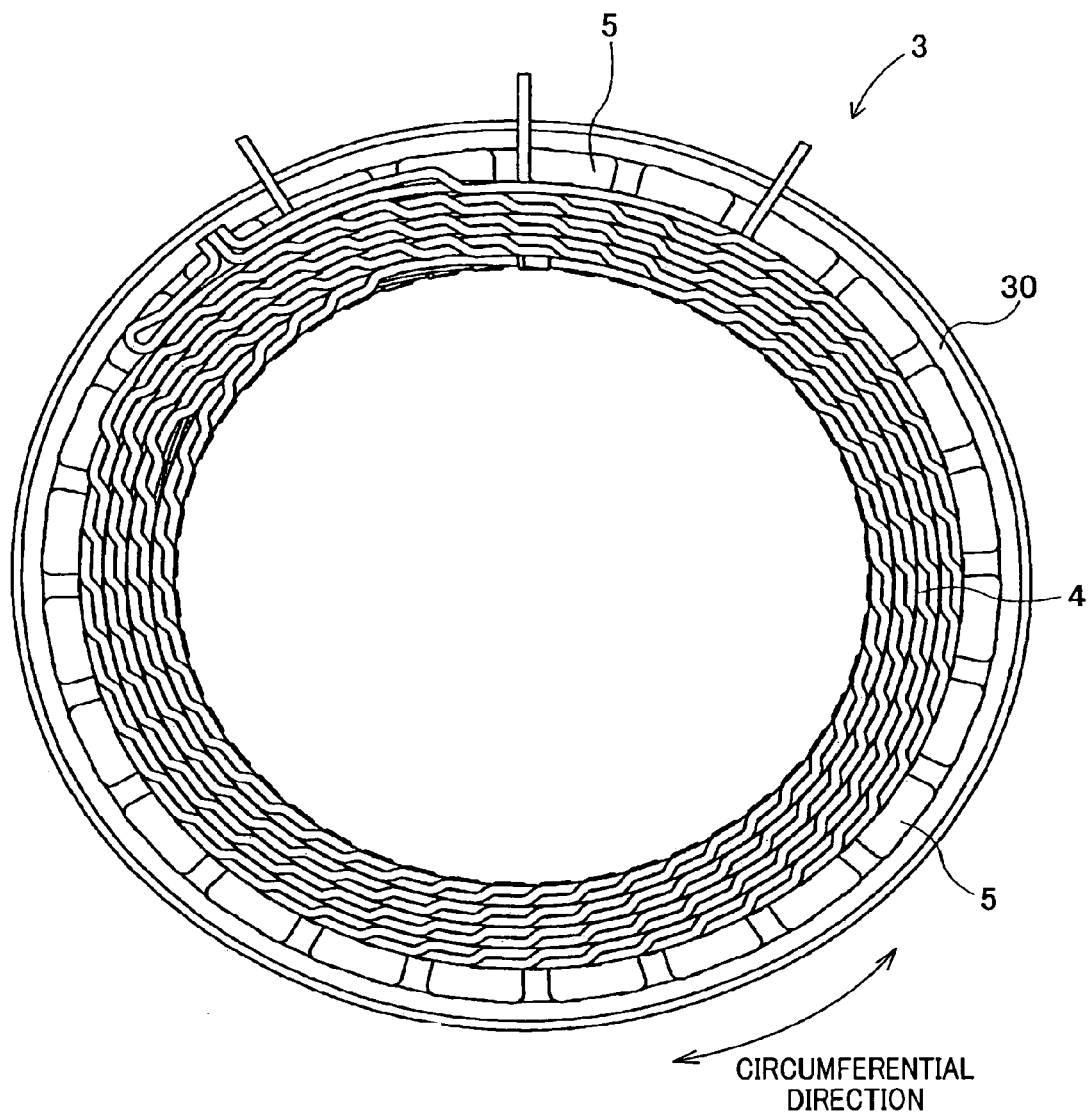
FIG. 2 is a perspective illustration of a stator in the rotary electric machine according to the embodiment.

As shown in FIG. 2, the stator 3 includes a stator core 30, a three-phase coil 4 formed of a plurality of phase windings, and insulating paper 5 arranged between the stator core 30 and the coil 4.

Figure 3:
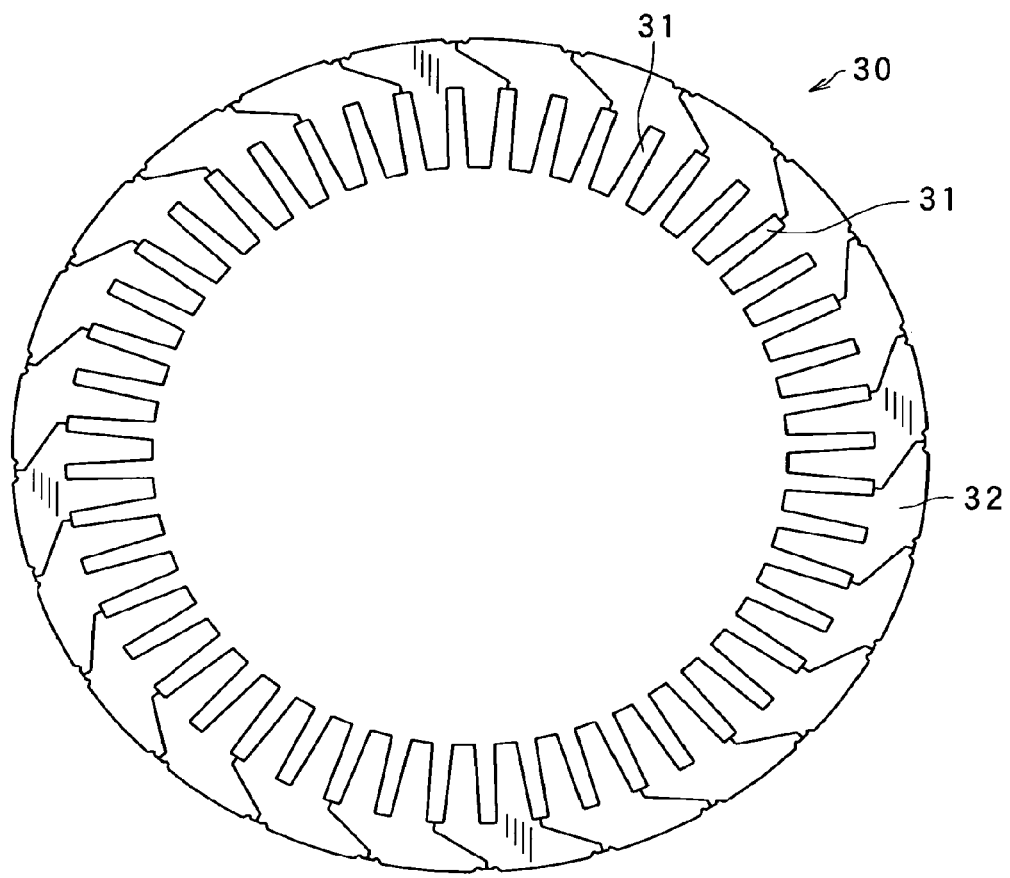
FIG. 3 is an illustration of a core of the stator in the rotary electric machine according to the embodiment.

As shown in FIG. 3, the stator core 30 has an annular shape, with a plurality of slots 31 being formed along its inner periphery. The plurality of slots 31 are formed in such a manner that the depthwise direction thereof coincides with the radial direction. The number of slots 31 formed in the stator core 30 is determined so that, for each of the magnetic poles of the rotor 2, two slots can be formed for each phase of the coil 4. That is, since the rotor 2 has eight magnetic poles, and the coil 4 has three phases which are to be provided with two slots each, a total of 8×3×2=48 slots 31 are formed.

In the stator core 30, twenty-four segment cores 32, one of which is shown in FIG. 4, are formed along its circumference. Each segment core 32 is formed into a shape which defines per se one slot 31 and also defines one slot together with another circumferentially adjacent segment core 32. In particular, the segment core 32 includes teeth portions 320 which extend in the inner radial direction and a back core portion 321 formed with the teeth portions 320.

The stator core 30, or each of the segment cores 32 configuring the stator core 30, is formed by laminating four hundred and ten electromagnetic steel plates each having a thickness of 0.3 mm with an insulating film being disposed therebetween. The stator core 30 may be formed of not only a laminated body of such electromagnetic plates, but also a laminated body of known metal plates and insulating films.

Figure 5A:
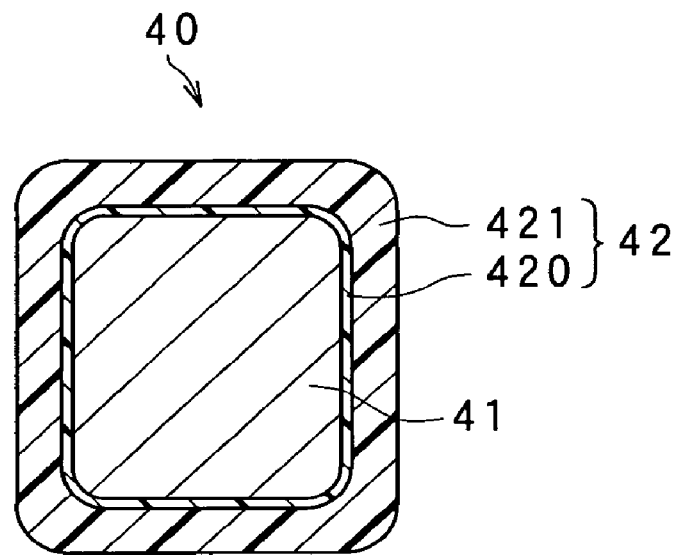
FIGS. 5A and 5B are cross sections each illustrating the configuration of a phase winding used for the coil of the rotary electric machine according to the embodiment.

The coil 4 is obtained by winding a plurality of wire members 40 using a given winding method. As shown in FIG. 5A, each of the wire members 40 configuring the coil 4 is formed of a copper conductor 41 and an insulating film 42. The insulating film 42 consists of an inner layer 420 and an outer layer 421 for covering the outer periphery of the conductor 41 and for insulating the conductor 41. The total thickness of the inner and outer layers 420 and 421 of the insulating film 42 is set so as to fall within a range of 100 μm to 200 μm. Thus, the thickness of the insulating film 42 consisting of the inner and outer layers 420 and 421 is so large that there is no need of interposing insulating paper, for example, in between the wiring wires 40, for achieving insulation therebetween. Still, however, as shown in FIG. 2, the insulating paper 5 may be arranged to ensure the insulation between the wires.

Figure 5B:
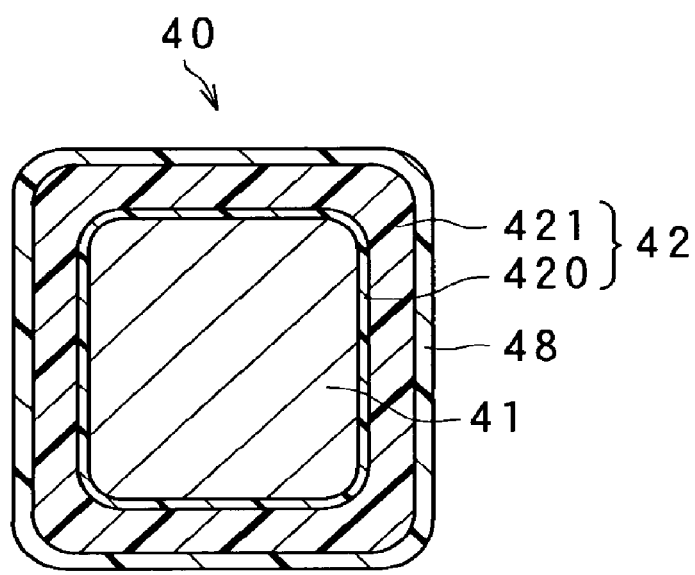

As shown in FIG. 5B, in each wire member 40 of the coil 4, the outer periphery of the insulating film 42 consisting of the inner and outer layers 420 and 421 may be covered with a fusing member 38 made of an epoxy resin, for example. The fusing member 48 covering the respective wires melts faster than the insulating film 42 with the heat generated in the rotary electric machine. Thus, thermal adhesion is caused between the plurality of wire members 40 disposed in a slot 31 by the fusing members 48. As a result, the plurality of wire members 40 disposed in the slot 31 are integrated and turn to a steel strip, whereby the mechanical strength of the wire members 40 in the slot 31 is enhanced.

Figure 6:
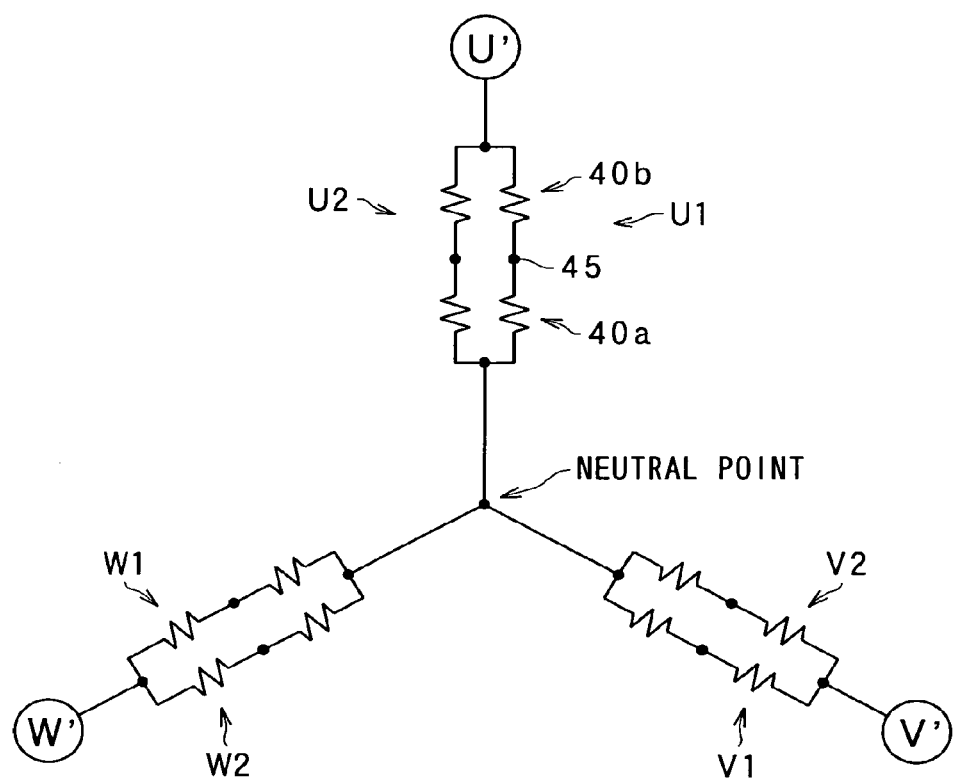
FIG. 6 is an illustration of wire connection in the coil of the rotary electric machine according to the present embodiment.

As shown in FIG. 6, the coil 4 is formed of three-phase windings (U1, U2, V1, V2, W1, W2), each phase having two windings.

Figure 7:
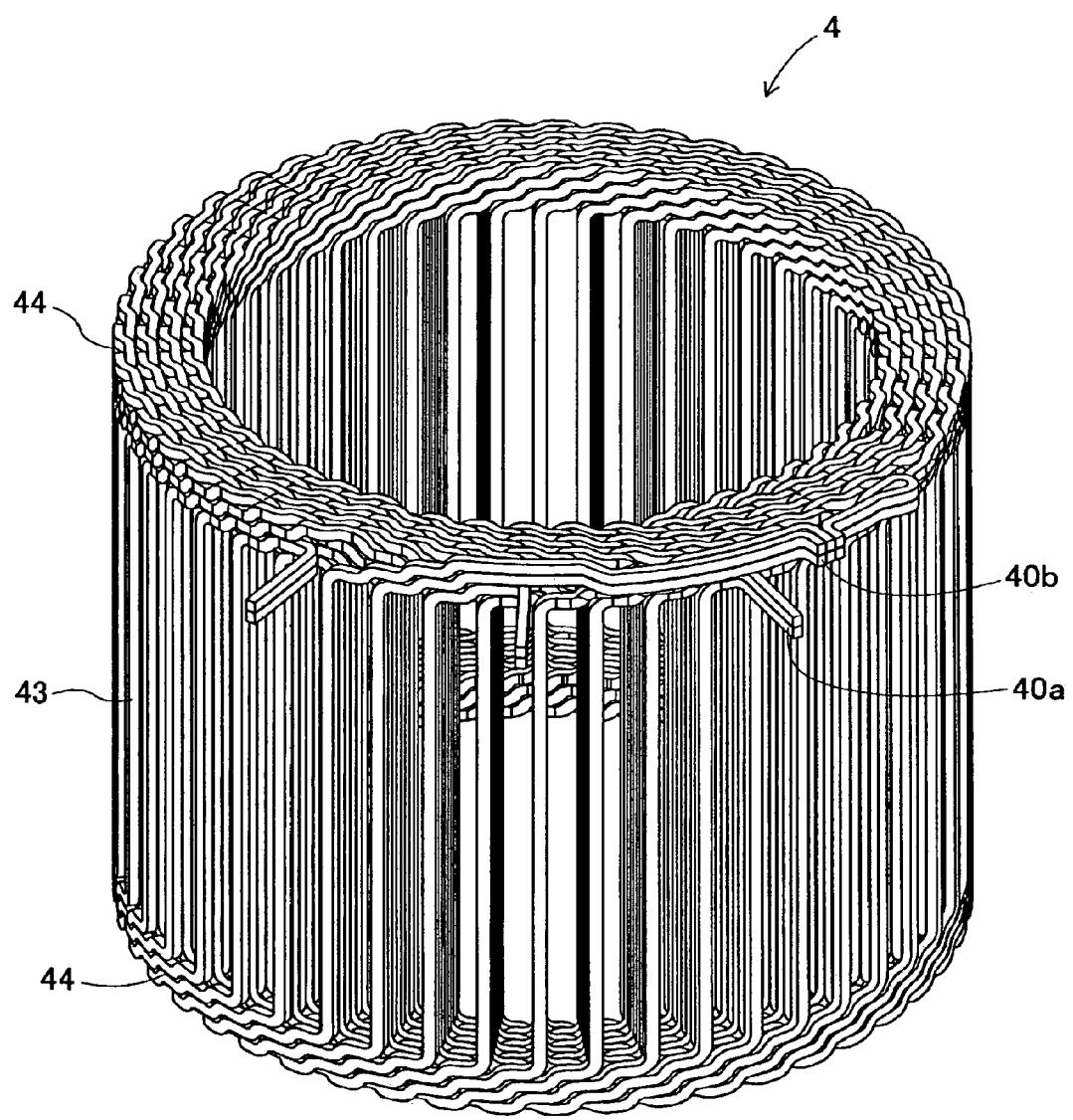
FIG. 7 is a perspective illustration of the coil of the rotary electric machine according to the embodiment.

As shown in FIG. 7, the coil 4 is formed by winding a plurality of the wire members 40 so as to have a given shape. Each of the wire members 40 configuring the coil 4 is provided in a manner of wave winding, along the circumferential direction on the inner peripheral side of the stator core 30. The coil 4 includes linear slot-accommodated portions 43 to be accommodated in the slots 31 that are formed in the stator core 30, and also includes turn portions 44 for connecting adjacent slot-accommodated portions 43. In one phase, the slot-accommodated portions 43 are each accommodated in every predetermined ordinal slot 31 (every sixth (3-phase× 2=6) slot 31 in the present embodiment). Each turn portion 44 is formed being projected from the axial end face of the stator core 30.

The coil 4 is formed by winding a plurality of wire members 40 in a wavy shape along the circumferential direction, with one end of each of them being projected from the axial end face of the stator core 30. One phase of the coil 4 is formed by welding and joining the other ends of first and second windings 40a, 40b which are circumferentially wound in a wavy form. The slot-accommodated portions 43 of the first and second windings 40a, 40b are each accommodated in every predetermined ordinal slot 31 as mentioned above. In this case, the slot-accommodated portions 43 of the two windings 40a, 40b are disposed so as to be alternately positioned depthwise in the slots 31. The welded portion, or a joined portion 45 (see FIG. 10), of the two windings 40a, 40b is formed in a return portion 46 (see FIG. 10) consisting of the slot-accommodated portions 43 at which the directions of winding the two winding wires 40a, 40b are reversed.

In the coil 4, one phase is formed of a connected winding member in which the first and second windings 40a, 40b are joined to each other. Accordingly, three phases (U, V, W) in the coil 4 are formed by using six joined wire bodies, i.e. using twelve (2 windings (40a, 40b)×3 phases (U, V, W)×2 slots=12) wire members 40.

In the present embodiment, each of the joined wire bodies formed by joining two first and second windings 40a, 40b is circumferentially wound four times to form the coil 4. Specifically, the coil 4 has a configuration in which each connected winding member formed by joining two windings 40a, 40b provides four layers in the radial direction, one layer being laid on the other. More specifically, one slot 31 is adapted to accommodate eight (4 layers×2 wires=8) slot-accommodated portions 43. In forming the coil 4, the joined wire bodies each formed by joining the two windings 40a, 40b, are wound so that one end of each of them is positioned on the side of the outermost circumferential layer and that the joined portion of each of them is positioned on the side of the innermost circumferential layer.

In the coil 4, the turn portions 44 are formed on both axial ends of the stator core 30. Each turn portion 44 has a portion approximately at the center thereof, which is formed into a cranked shape without a twist. The cranked shape of the turn portion 44 is ensured to be provided in the circumferential direction. The amount of an offset caused by the cranked shape of the turn portion 44 is ensured to substantially correspond to the width of the wire member 40. Owing to this, no interference is caused between the turn portions 44 of each wire member 40, which are adjacently located in the radial direction, thereby enabling tight winding with the turn portions 44. As a result, the radial length of the coil end projected from the end face of the stator core 30 of the coil 4 can be reduced. Thus, the wire members 40 forming the coil 4 can be prevented from jutting outward in the radial direction.

Each turn portion 44 projected out of the stator core 30 from the slot 31 is formed into a staircase pattern starting from the axial end face of the stator core 30. The formation of the turn portion 44 into a staircase pattern can contribute to preventing possible interference between the staircase-pattern turn portions 44 of each wire member 40 and the wire members 40 projected from the circumferentially adjacent slots. Thus, it is no longer necessary to increase the height of the coil end projected from the end face of the stator core 30 of the coil 4, or to increase the radial length of the coil end, in order to avoid possible interference between the wire members 40 projected from the circumferentially adjacent slots. As a result, the height of the coil end can be reduced. Further, since the radial length of the coil end is reduced, the coil 4 can be prevented from jutting outward in the radial direction.

Each staircase-pattern turn portion 44 is formed so as to have four steps. The height of one step of the four-step staircase-pattern turn portion 44 substantially corresponds to the width (or height) of each wire member 40. Thus, when the turn portions 44 are axially laid one on the other, no gap is formed between the turn portions 44 to thereby enable tight winding with the turn portions 44.

As will be understood from the description provided above, the staircase-pattern turn portion 44 has a shape which is a combination of cranked shapes.

In the coil 4, one end of each of the joined wire bodies formed of wire members 40 configuring the coil 4 is permitted to project radially outward within the range of the height of the coil end projecting from the stator core 30, i.e. within the range of the projection of the turn portions 44. Also, the other end of each of the joined wire bodies, or the end on the side of a neutral point, is permitted to project radially outward at a higher level than the one end.

Referring now to FIGS. 8 to 13, hereinafter will be provided a more detailed description on the winding conditions of the wire members 40 configuring the coil 4 of the present embodiment.

Figure 8:
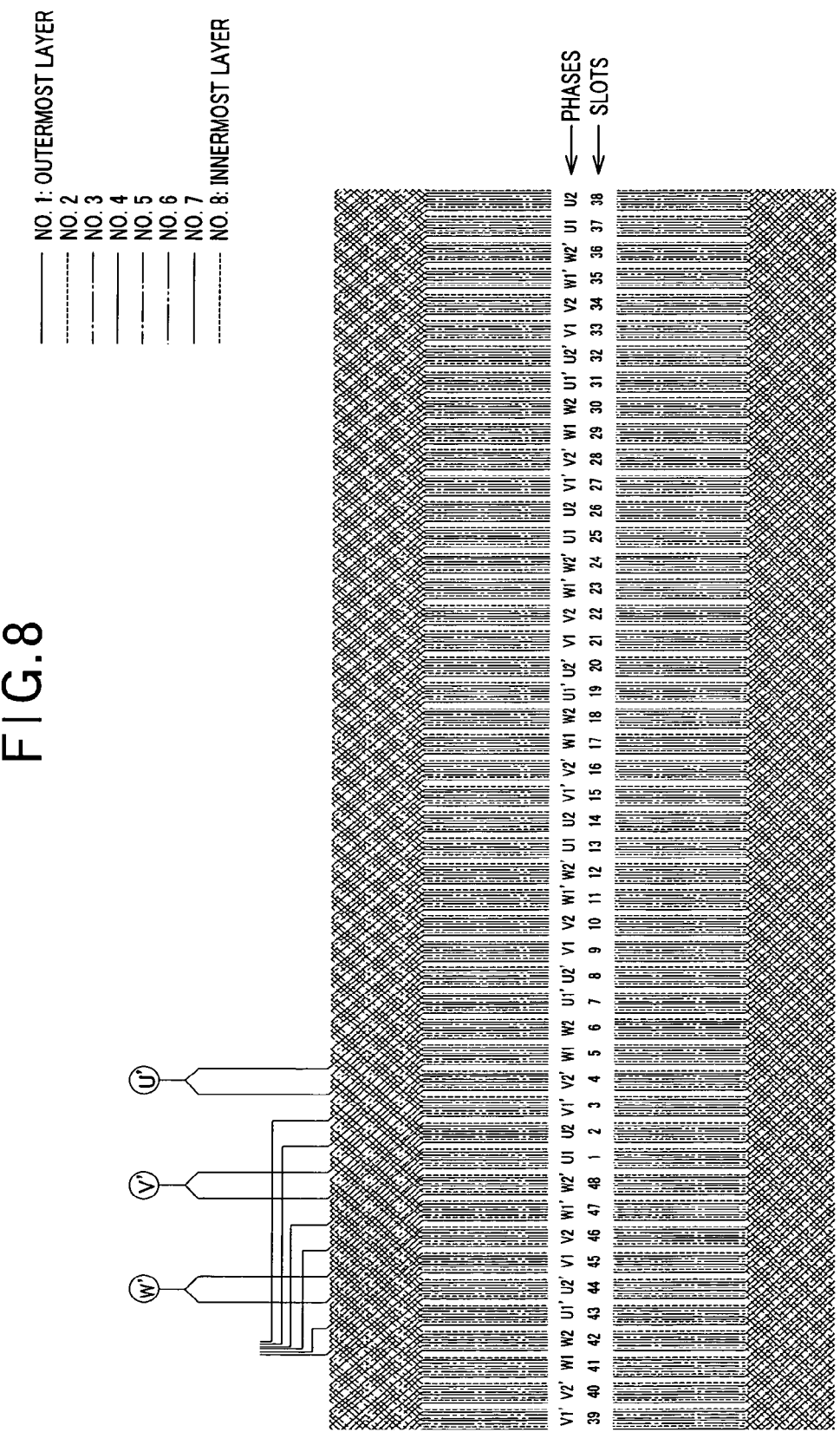
FIG. 8 is an illustration of wire connection in the coil of the rotary electric machine according to the embodiment.
Figure 9:
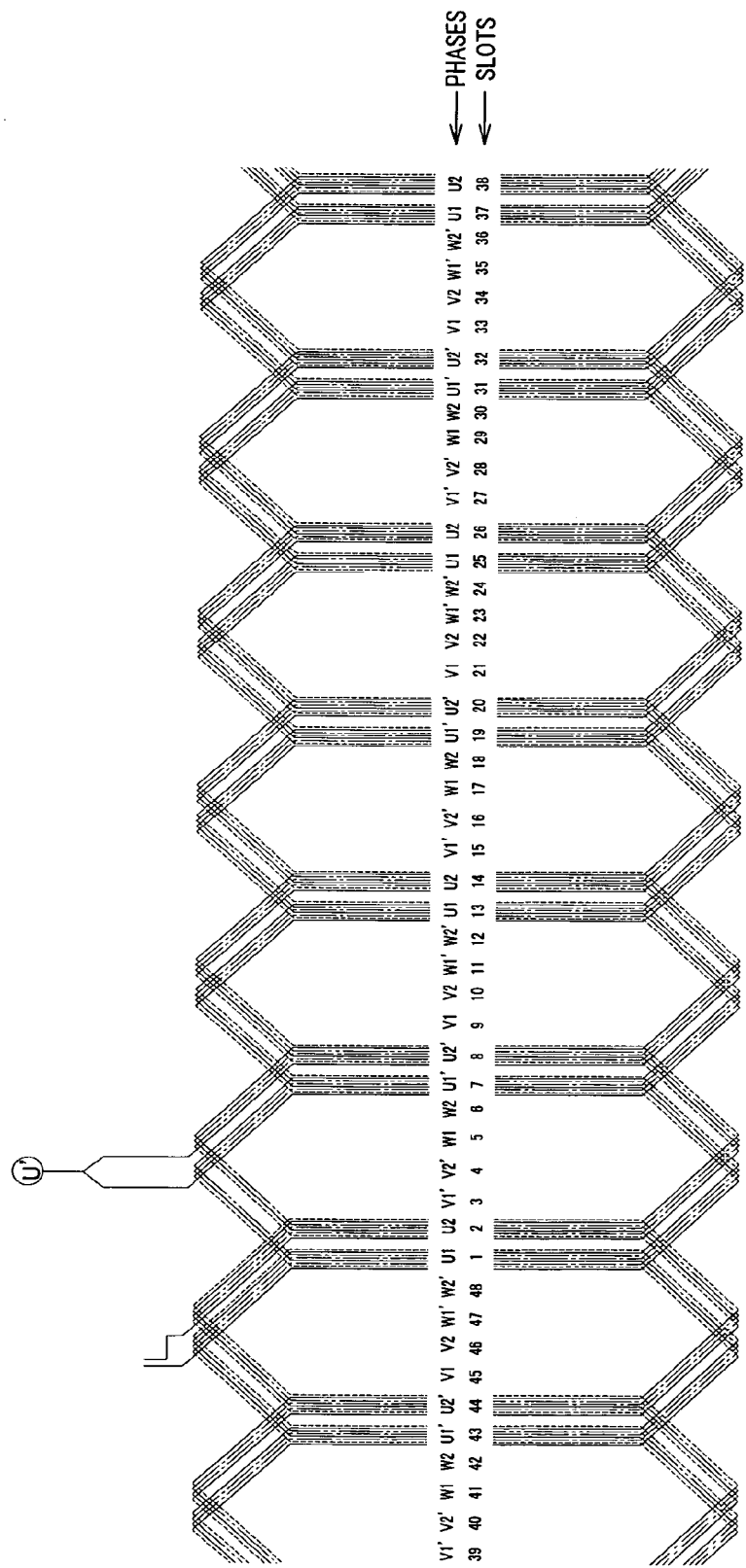
FIG. 9 is an illustration of U-phase wire connection in the coil of the rotary electric machine according to the embodiment.

The coil 4 of the present embodiment is formed of two three-phase windings (U1, U2, V1, V2, W1, W2). FIG. 8 shows connecting conditions of the three-phase windings. The slot numbers in FIG. 8 have been designated by designating "#1" to the slot 31 accommodating the slot-accommodated portion 43 located closest to the end on the side of the neutral point of the wire members 40 forming phase U1. The subsequent slots 31 have been sequentially designated with "#2", "#3", . . . along the circumferential direction in which the wire members 40 are wound, for the sake of convenience. FIG. 9 shows the connecting conditions of only the wire members 40 forming phase U (U1, U2) shown in FIG. 8. In FIGS. 8 and 9, those portions which are linearly and vertically illustrated correspond to the slot-accommodated portions 43, and those portions which are obliquely illustrated on the upper and lower sides correspond to the turn portions 44.

Figure 10:
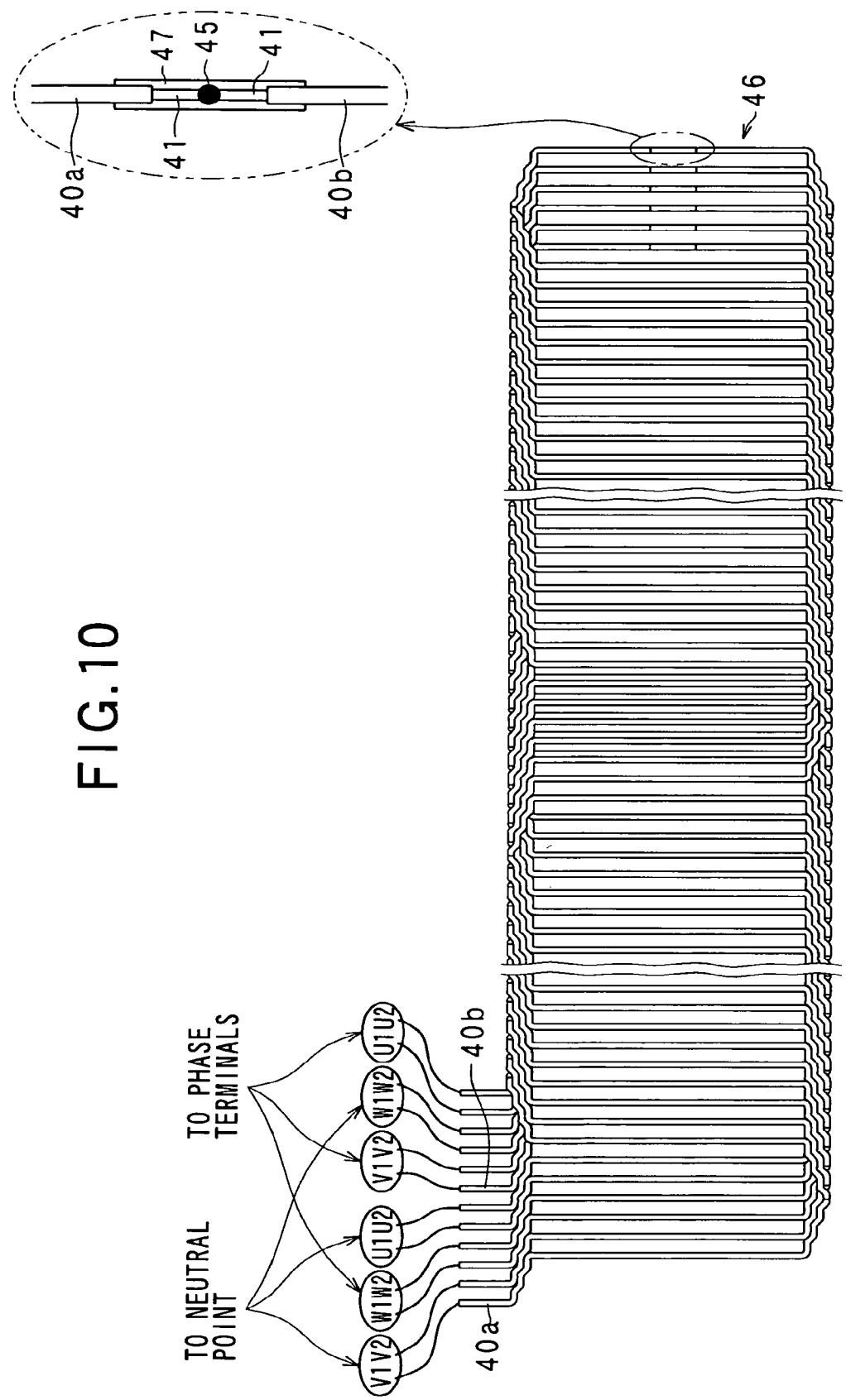
FIG. 10 is an illustration of a plastic body of stator windings forming the coil of the rotary electric machine according to the embodiment.

FIG. 10 is a development of the coil 4 according to the present embodiment. As shown in FIG. 10, the coil 4 is formed using six joined wire bodies formed by joining two windings 40a, 40b for respective phases (U1, U2, V1, V2, W1, W2). In each connected winding member, two windings 40a, 40b are each joined by welding the conductors thereof. Specifically, in each connected winding member, the end on the side of the neutral point and the end opposite to the end on the side of the phase terminal are joined together by welding. The welded portion 45 is covered with an insulating resin film 47.

Figure 11:
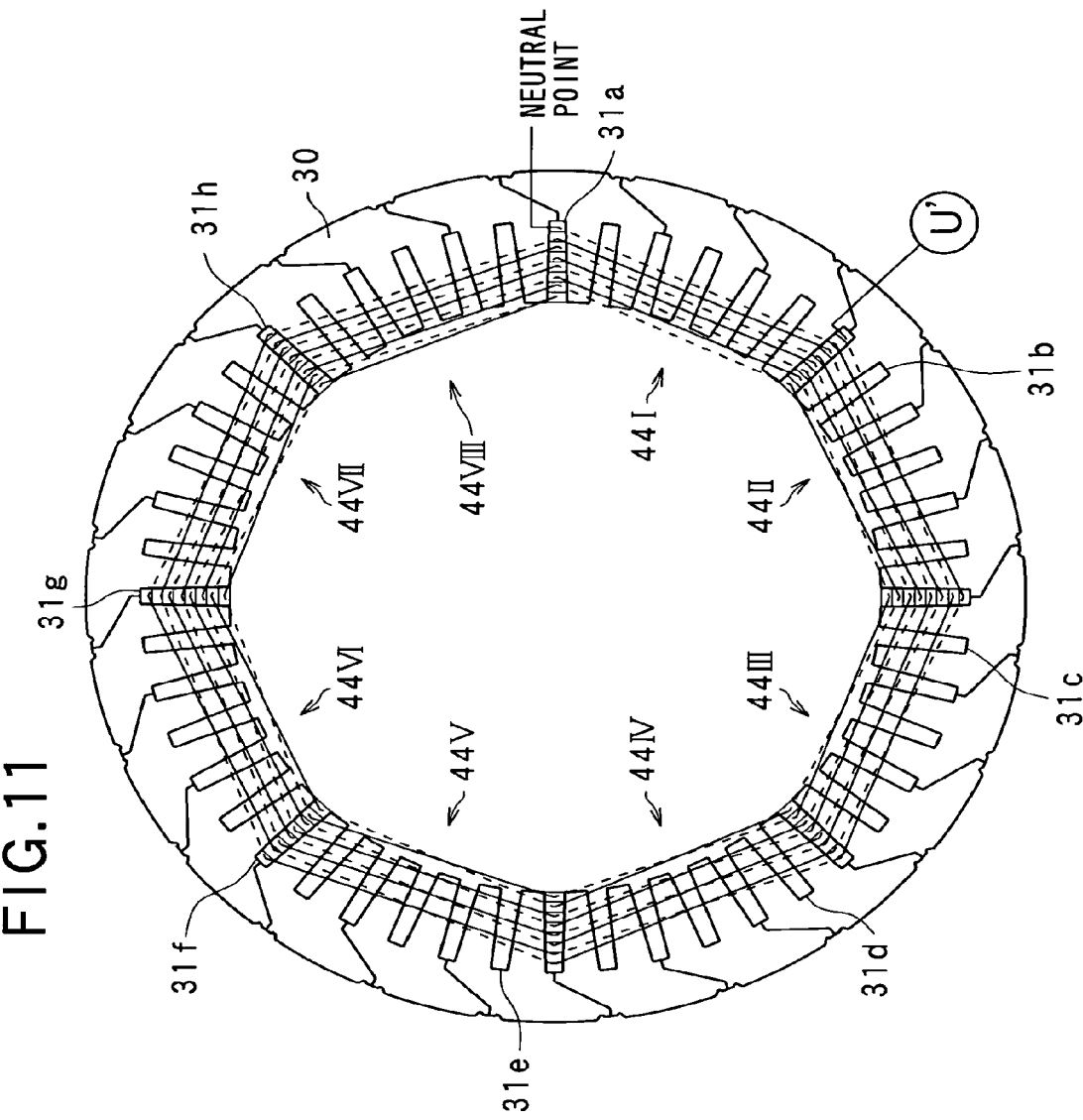
FIG. 11 is an illustration of U1-phase wire connection in the coil of the rotary electric machine according to the embodiment.
Figure 12:
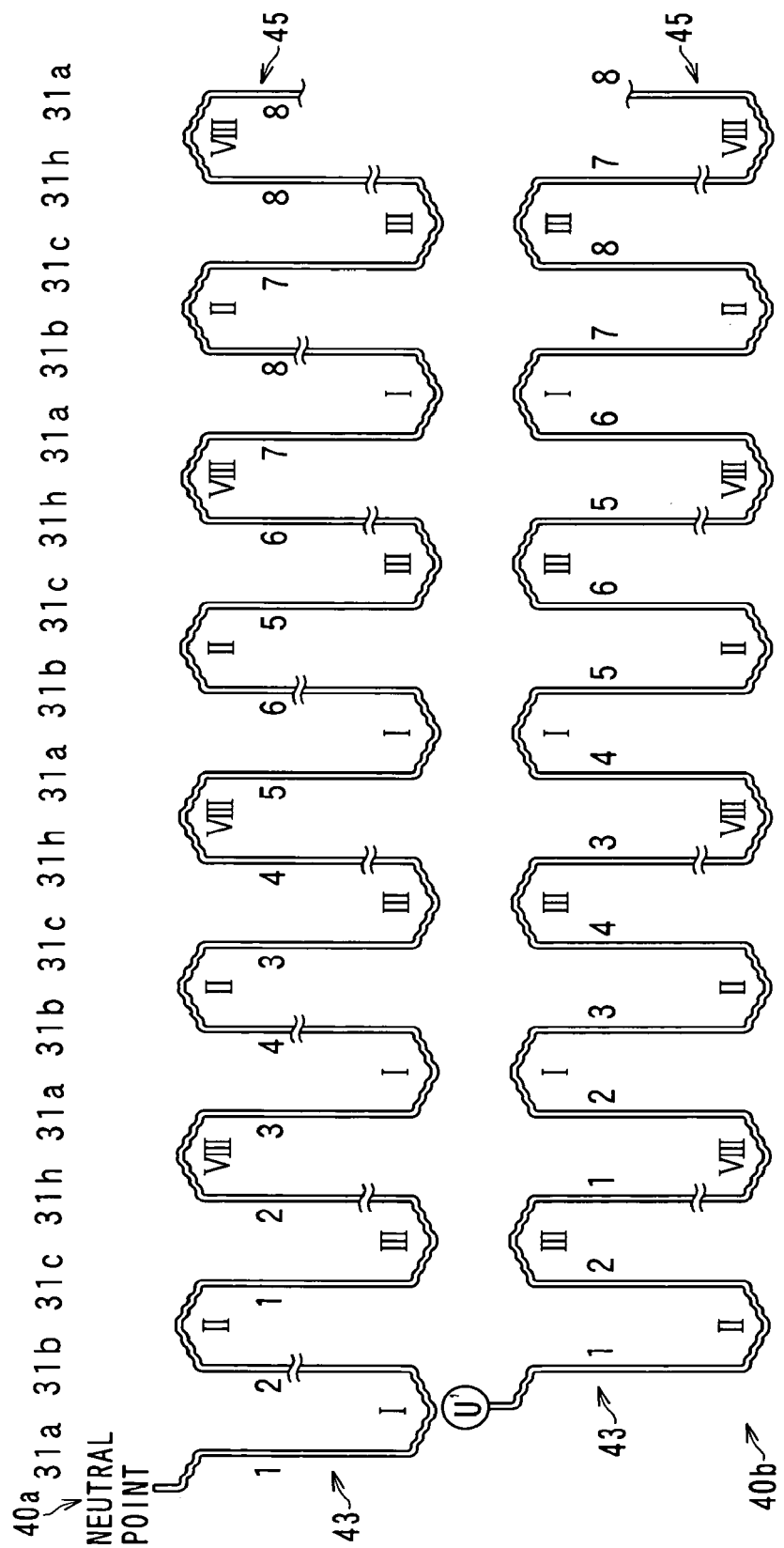
FIG. 12 is an illustration of U1-phase windings in position in the slots in the rotary electric machine according to the embodiment.

Each of the phases is formed using a similar connecting method. The connecting method, or the manner of winding the wire members 40 of the coil 4, is explained taking phase U1 as an example. FIG. 11 shows the connecting conditions of the wire members 40 in phase U1. FIG. 12 shows the depthwise positions of the first and second windings 40a, 40b in the slots 31, relative to the positions of the turn portions 44.

For accommodating the wire members 40 forming phase U1, eight slots 31 (31a, 31b, . . . , 31h) are formed in the stator core 30 in conformity with the eight magnetic poles of the rotor 2. Each of the slots 31a, 31b, . . . , 31h is accommodated with four layers of a connected winding member. The connected winding member is formed so that the slot-accommodated portions 43 are laid one on the other, and thus eight slot-accommodated portions 43 are accommodated depthwise in each slot 31, being laid one on the other. The positions where the respective slot-accommodated portions 43 are located depthwise for accommodation in each slot 31 are designated with "No. 8", "No. 7", "No. 6", . . . , "No. 1" as the depth increases from the opening portion.

The connected winding member of the wire members 40 accommodated in phase U1 consists of first and second windings 40a, 40b joined together. An end of the first winding 40a is connected to the neutral point of the stator 3 and an end of the second winding 40b is connected to phase U1.

The slot-accommodated portion 43 of the first winding 40a, which is closest to the neutral point is accommodated at position "No. 1" of the slot 31a. The slot-accommodated portion 43 of the second winding 40b, which is closest to the end thereof is accommodated at position "No. 1" in the slot 31b.

The subsequent slot-accommodated portion 43 of the first winding 40a is connected to the slot-accommodated portion 43 accommodated in the slot 31a through the turn portion 44. Specifically, the subsequent slot-accommodated portion 43 of the first winding 40a is connected to the slot-accommodated portion 43 accommodated in the slot 31a through a turn portion 44I (bottom) on one end side (hereinafter referred to as "upper side") and accommodated at position "No. 2" of the slot 31b. This lower side trails from the other end side (hereinafter referred to as "upper side") from which the end of the first winding 40a to be connected to the neutral point is projected in the axial direction of the stator core 30. Thus, the turn portion 44I (bottom) establishes connection between position "No. 1" of the slot 31a and position "No. 2" of the slot 31b on the lower side of the stator core 30.

The slot-accommodated portion 43 of the second winding 40b subsequent to the one accommodated in the slot 31b is accommodated at position "No. 2" of the slot 31c through a lower side turn portion 44II (bottom). Thus, the turn portion 44II (bottom) connects position "No. 1" of the slot 31b to position "No. 2" of the slot 31c on the lower side of the stator core 30.

The slot-accommodated portion 43 of the first winding 40a subsequent to the one accommodated in the slot 31b is accommodated at position "No. 1" of the slot 31c through an upper turn portion 44II (top). Thus, the turn portion 44II (top) connects position "No. 2" of the slot 31b to position "No. 1" of the slot 31c on the upper side of the stator core 30.

The slot-accommodated portion 43 of the second winding 40b subsequent to the one accommodated in the slot 31c is accommodated at position "No. 1" of the slot 31d through an upper turn portion 44III (top). Thus, the turn portion 44III (top) connects position "No. 2" of the slot 31c to position "No. 1" of the slot 31d on the upper side of the stator core 30.

In this way, the first and second windings 40a, 40b connect positions "No. 2" to positions "No. 1" of the adjacent slots 31 through the turn positions 44I (top) to 44VII (top) located on the upper side of the stator core 30. Similarly, the first and second windings 40a, 40b connect positions "No. 2" to positions "No. 1" in the adjacent slots 31 through the turn positions 44I (bottom) to 44VII (bottom) located on the lower side of the stator core 30. Using this connecting method, the slot-accommodated portions 43 of the first and second windings 40a, 40b are disposed in the slots 31a to 31h with one circumferential winding. In the slot 31h, the slot-accommodated portion 43 of the second winding 40b is accommodated at position "No. 1" and the slot-accommodated portion 43 of the first winding 40a is accommodated at position "No. 2".

Then, the slot-accommodated portion 43 of the first winding 40a subsequent to the one accommodated at position "No. 2" of the slot 31h is accommodated at position "No. 3" of the slot 31a through the upper turn portion 44VII (top). Thus, the turn portion 44VII (top) connects position "No. 2" of the slot 31h to position "No. 3" of the slot 31a on the upper side of the stator core 30. In other words, as a result of one circumferential winding, the connected winding member is wound radially inward while being offset radially inward by an amount corresponding to the width of one layer.

Similarly, the slot-accommodated portion 43 of the second winding 40b subsequent to the one accommodated at position "No. 1" of the slot 31h is accommodated at position "No. 2" of the slot 31a through the lower turn portion 44VIII (bottom). Then, the slot-accommodated portion 43 of the second winding 40b subsequent to the slot-accommodated portion 43 accommodated at position "No. 2" of the slot 31a is accommodated at position "No. 3" of the slot 31b through the upper turn portion 44I (top). Thus, the turn portion 44I (top) connects position "No. 2", of the slot 31a to position "No. 3" of the slot 31b on the upper side of the stator core 30.

The slot-accommodated portion 43 of the first winding 40a subsequent to the one accommodated in the slot 31a is accommodated at position "No. 4" of the slot 31b, being connected through the lower side turn portion 44I (bottom). Thus, the turn portion 44I (bottom) connects position "No. 3" of the slot 31a to position "No. 4" of the slot 31b on the lower side of the stator core 30.

The slot-accommodated portion 43 of the second winding 40b subsequent to the one accommodated in the slot 31b is accommodated at position "No. 4" of the slot 31c through the lower turn portion 44II (bottom). Thus, the turn portion 44II (bottom) connects position "No. 3" of the slot 31b to position "No. 4" of the slot 31c on the lower side of the stator core 30.

The slot-accommodated portion 43 of the first winding 40a subsequent to the one accommodated in the slot 31b is accommodated at position "No. 3" of the slot 31c through the upper turn portion 44II (top). Thus, the turn portion 44II (top) connects position "No. 4" of the slot 31b to position "No. 3" of the slot 31c on the upper side of the stator core 30.

The slot-accommodated portion 43 of the second winding 40b subsequent to the one accommodated in the slot 31c is accommodated at position "No. 3" of the slot 31d through the upper turn portion 44III (top). Thus, the turn portion 44III (top) connects position "No. 4" of the slot 31c to position "No. 3" of the slot 31d on the upper side of the stator core 30.

In this way, the first and second windings 40a, 40b are wound in such a way that the turn portions 44I (top) to 44VII (top) located on the upper side of the stator core 30 can connect positions "No. 4" to positions "No. 3" in adjacent slots, and that the turn portions 44I (bottom) to 44VII (bottom) located on the lower side of the stator core 30 can connect positions "No. 3" to positions "No. 4" in adjacent slots. Using this connecting method, the first and second windings 40a, 40b are disposed in the slots 31a to 31h with one circumferential winding. In the slot 31h, the slot-accommodated portion 43 of the second winding 40b is accommodated at position "No. 3", and the slot-accommodated portion 43 of the first winding 40a is accommodated at position "No. 4".

Then, the slot-accommodated portion 43 of the first winding 40a subsequent to the one accommodated at position "No. 4" of the slot 31h is accommodated at position "No. 5" of the slot 31a through the upper turn portion 44VIII (top). Thus, the turn portion 44VIII (top) connects position "No. 4" of the slot 31h to position "No. 5" of the slot 31a on the upper side of the stator core 30. In other words, as a result of one circumferential winding, the connected winding member is wound radially inward while being offset radially inward by an amount corresponding to the width of one layer.

Similarly, the slot-accommodated portion 43 of the second winding 40b subsequent to the one accommodated at position "No. 3" of the slot 31h is accommodated at position "No. 4" of the slot 31a through the lower turn portion 44VIII (bottom). Then, the slot-accommodated portion 43 of the second winding 40b subsequent to the one accommodated at position "No. 4" of the slot 31a is accommodated at position "No. 5" of the slot 31b through the upper turn portion 44I (top). Thus, the turn portion 44I (top) connects position "No. 4" of the slot 31a to position "No. 5" of the slot 31b on the upper side of the stator core 30.

The slot-accommodated portion 43 of the first winding 40a subsequent to the one accommodated in the slot 31a is accommodated at position "No. 6" of the slot 31b, being connected through the lower turn portion 44I (bottom) and. Thus, the turn portion 44I (bottom) connects position "No. 5" of the slot 31a to position "No. 6" of the slot 31b on the lower side of the stator core 30.

The slot-accommodated portion 43 of the second winding 40b subsequent to the one accommodated in the slot 31b is accommodated at position "No. 6" of the slot 31c, being connected through the lower turn portion 44II (bottom). Thus, the turn portion 44II (bottom) connects position "No. 5" of the slot 31b to position "No. 6" of the slot 31c on the lower side of the stator core 30.

The slot-accommodated portion 43 of the first winding 40a subsequent to the one accommodated in the slot 31b is accommodated at position "No. 5" of the slot 31c, being connected through the upper side turn portion 44II (top) and. Thus, the turn portion 44II (top) connects position "No. 6" of the slot 31b to position "No. 5" of the slot 31c on the upper side of the stator core 30.

The slot-accommodated portion 43 of the second winding 40b subsequent to the one accommodated in the slot 31c is accommodated at position "No. 5" of the slot 31d, being connected through the upper turn portion 44III (top). Thus, the turn portion 44III (top) connects position "No. 6" of the slot 31c to position "No. 5" of the slot 31d on the upper side of the stator core 30.

In this way, the first and second windings 40a, 40b are wound in such a way that the turn portions 44I (top) to 44VII (top) located on the upper side of the stator core 30 can connect positions "No. 6" to positions "No. 5" in adjacent slots, and that the turn portions 44I (bottom) to 44VII (bottom) located on the lower side of the stator core 30 can connect positions "No. 5" to positions "No. 6" in adjacent slots, Using this connecting method, the first and second windings 40a, 40b are disposed in the slots 31a to 31h with one circumferential winding. In the slot 31h, the slot-accommodated portion 43 of the second winding 40b is accommodated at position "No. 5", and the slot-accommodated portion 43 of the first winding 40a is accommodated at position "No. 6".

Then, the slot-accommodated portion 43 of the first winding 40a subsequent to the one accommodated at position "No. 6" of the slot 31h is accommodated at position "No. 7" of the slot 31a through the upper turn portion 44VIII (top). The turn portion 44VIII (top) connects the slot-accommodated portion 43 at position "No. 6" of the slot 31h to the slot-accommodated portion 43 at position "No. 7" of the slot 31a on the upper side of the stator core 30. In other words, as a result of one circumferential winding, the connected winding member is wound radially inward while being offset radially inward by an amount corresponding to the width of one layer.

Similarly, the slot-accommodated portion 43 of the second winding 40b subsequent to the one accommodated at position "No. 5" of the slot 31h is accommodated at position "No. 6" of the slot 31a through the upper turn portion 44VIII (bottom). Also, the slot-accommodated portion 43 of the winding wire 41b subsequent to the one accommodated at position "No. 6" of the slot 31a is accommodated at position "No. 7" of the slot 31b through the upper turn portion 44I (top). Thus, the turn portion 44I (top) connects position "No. 6" of the slot 31a and position "No. 7" of the slot 31b on the upper side of the stator core 30.

The slot-accommodated portion 43 of the first winding 40a subsequent to the one accommodated in the slot 31a is accommodated at position "No. 8" of the slot 31b, being connected through the lower turn portion 44I (bottom). Thus, the turn portion 44I (bottom) connects position "No. 7" of the slot 31a to position "No. 8" of the slot 31b on the lower side of the stator core 30.

The slot-accommodated portion 43 of the second winding 40b subsequent to the one accommodated in the slot 31b is accommodated at position "No. 8" of the slot 31c, being connected through the lower turn portion 44II (bottom). Thus, the turn portion 44II (bottom) connects position "No. 7" of the slot 31b to position "No. 8" of the slot 31c on the lower side of the stator core 30.

The slot-accommodated portion 43 of the winding wire 40a subsequent to the one accommodated in the slot 31b is accommodated at position "No. 7" of the slot 31c, being connected through the upper side turn portion 44II (top). Thus, the turn portion 44II (top) connects position "No. 8" of the slot 31b to position "No. 7" of the slot 31c on the upper side of the stator core 30.

The slot-accommodated portion 43 of the second winding 40b subsequent to the one accommodated in the slot 31c is accommodated at position "No. 7" of the slot 31d, being connected through the upper side turn portion 44III (top). Thus, the turn portion 44III (top) connects position "No. 8" of the slot 31c to position "No. 7" of the slot 31d on the upper side of the stator core 30.

In this way, the first and second windings 40a, 40b are wound in such a way that the turn portions 44I (top) to 44VII (top) located on the upper side of the stator core 30 can connect positions "No. 8" to positions "No. 7" in adjacent slots, and that the turn portions 44I (bottom) to 44VII (bottom) located on the lower side of the stator core 30 can connect positions "No. 7" to positions "No. 8" in adjacent slots. Using this connecting method, the first and second windings 40a, 40b are disposed in the slots 31a to 31h with one circumferential winding. In the slot 31h, the slot-accommodated portion 43 of the second winding 40b is accommodated at position "No. 7", and the slot-accommodated portion 43 of the first winding 40a is accommodated at position "No. 8".

Then, the slot-accommodated portion 43 of the first winding 40a subsequent to the one accommodated at position "No. 8" of the slot 31h is accommodated at position "No. 8" of the slot 31a through the upper turn portion 44VIII (top). The −4th layer of the turn portion 44VIII (top) connects the slot-accommodated portion 43 at position "No. 8" of the slot 31h to the slot-accommodated portion 43 at position "No. 8" of the slot 31a on the upper side of the stator core 30. In other words, the two slot-accommodated portions 43, 43 located at the same depthwise positions are connected to each other.

Similarly, the slot-accommodated portion 43 of the winding wire 40b subsequent to the one accommodated at position "No. 7" of the slot 31h is accommodated at position "No. 8" of the slot 31a through the lower turn portion 44VIII (bottom).

Position "No. 8" of the slot 31a accommodates the slot-accommodated portions 43 formed with the joint portion of the first and second winding s 40a, 40b. The slot-accommodated portions 43 accommodated at position "No. 8" of the slot 31a form the return portion 46. As explained above, the connected winding member of the two winding wires 40a, 40b is wound about the stator core 30 to form phase U1.

In this way, the slot-accommodated portions 43 of the first and second windings 40a, 40b forming phase U1 are accommodated in every predetermined ordinal slot 31 along the circumferential direction, alternating the depthwise positions of the slot-accommodated portions 43 in the slots 31.

In this way, the six joined wire bodies are wound to form phases U1, U2, V1, V2, W1, W2.

Figure 13:
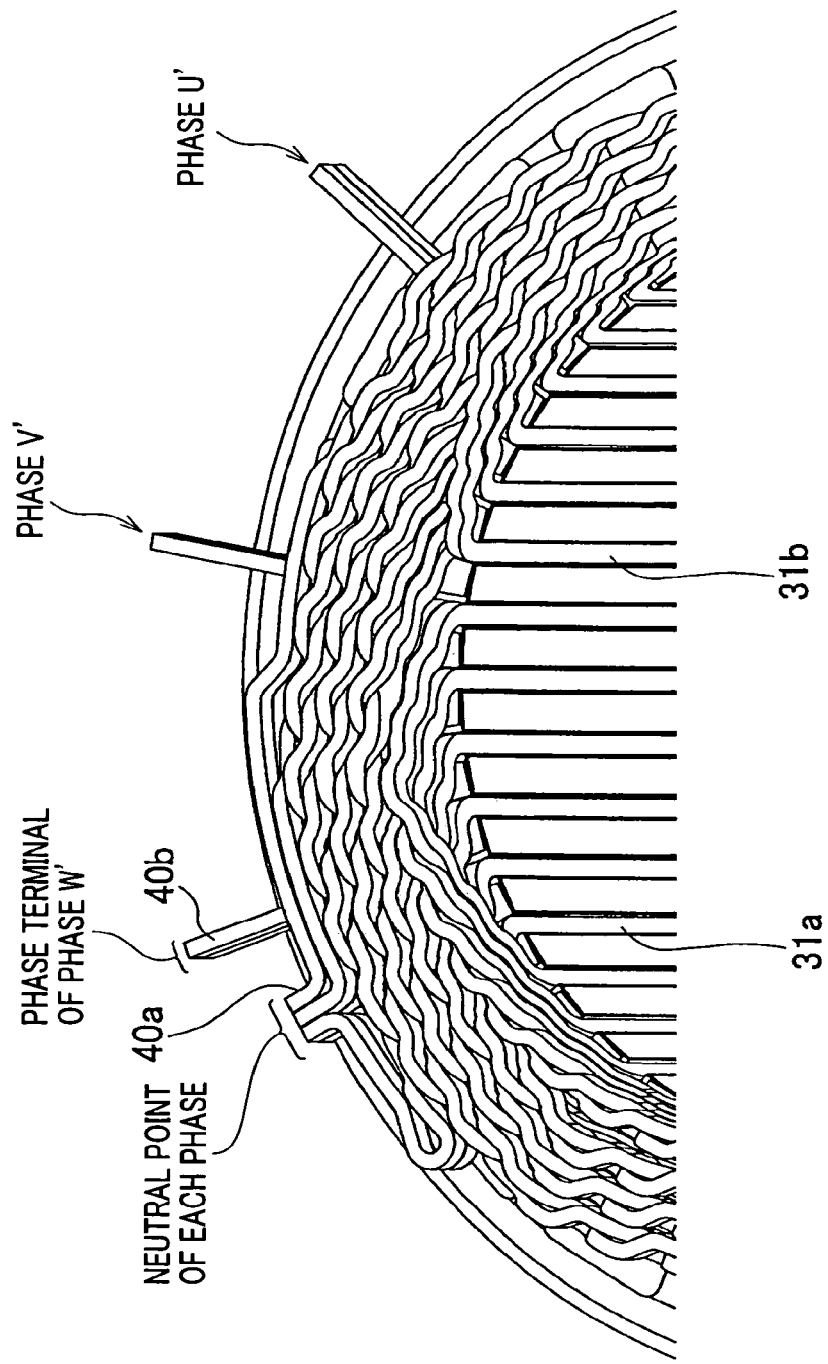
FIG. 13 is an illustration of turn portions of the stator, which are routed to pass radially the outer side in the rotary electric machine according to the embodiment.
Figure 14:
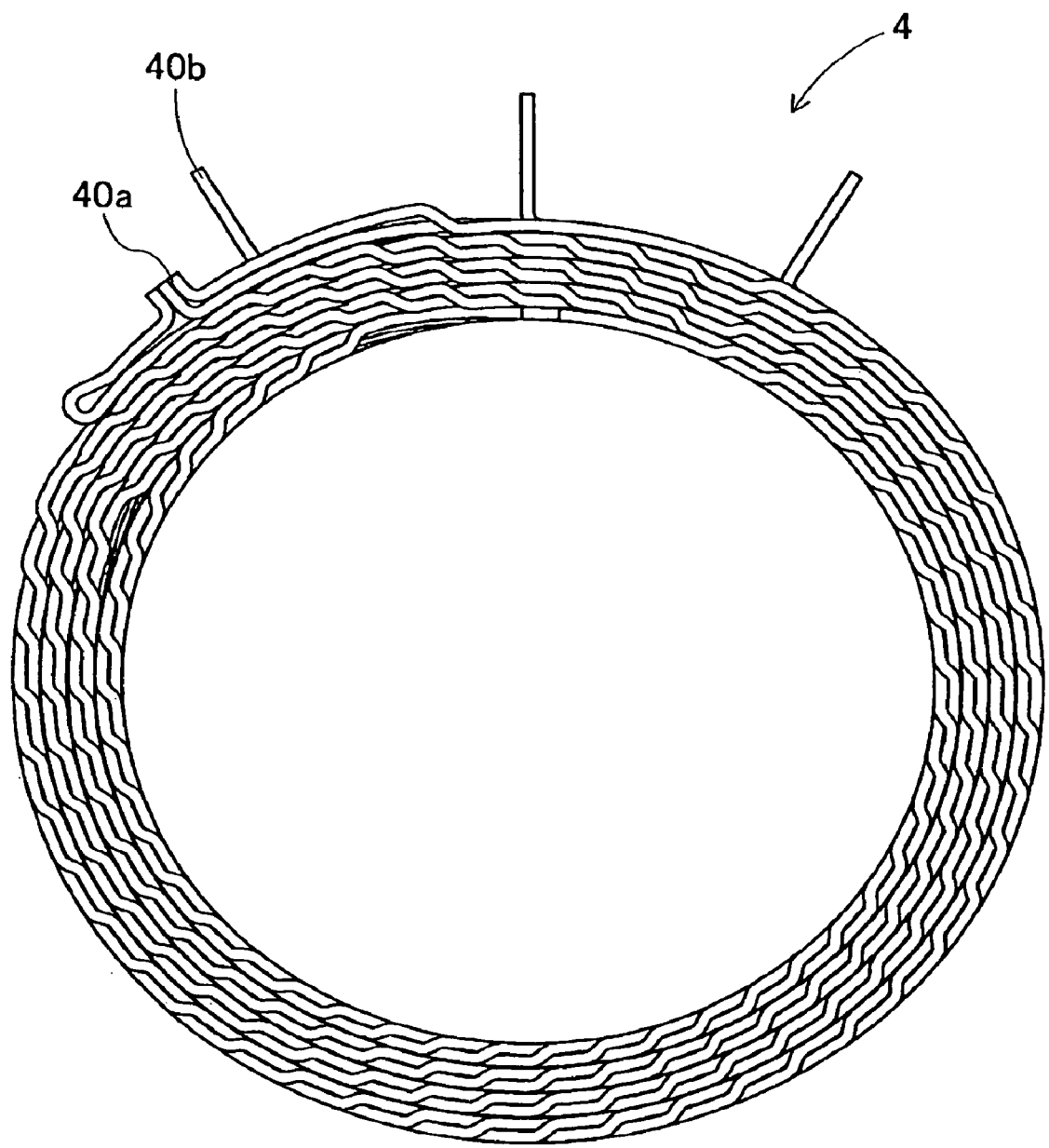
FIG. 14 is a top plan of the coil of the rotary electric machine according to the embodiment.

As shown in FIGS. 13 and 14, the turn portion 44VIII (top) of the $-4^{th}$ layer connects position "No. 8" of the slot 31h and position "No. 8" of the slot 31a on the upper side of the stator core 30, The turn portion 44VIII (top) of the $-4^{th}$ layer and the turn portions 44VIII (top) of other layers that are circumferentially in the same position as the turn portion of the $-4^{th}$ layer, are offset radially outward to provide a coil end with an offset shape. Thus, the turn portion VIII (top) of the $-4^{th}$ layer, which connects position "No. 8" of the slot 31h to position "No. 8" of the slot 31a, no longer causes interference with other turn portions VIII (top). In addition, owing to this configuration, the coil end can be downsized. Also, as shown in FIG. 14, the wire members 40 are no longer projected radially inward from the inner peripheral surface of the coil 4, which faces the rotor 2.

Comparative Example

In the present comparative example, the identical or similar components to those in the above embodiment are given the same reference numerals for the sake of omitting explanation.

Figure 15:
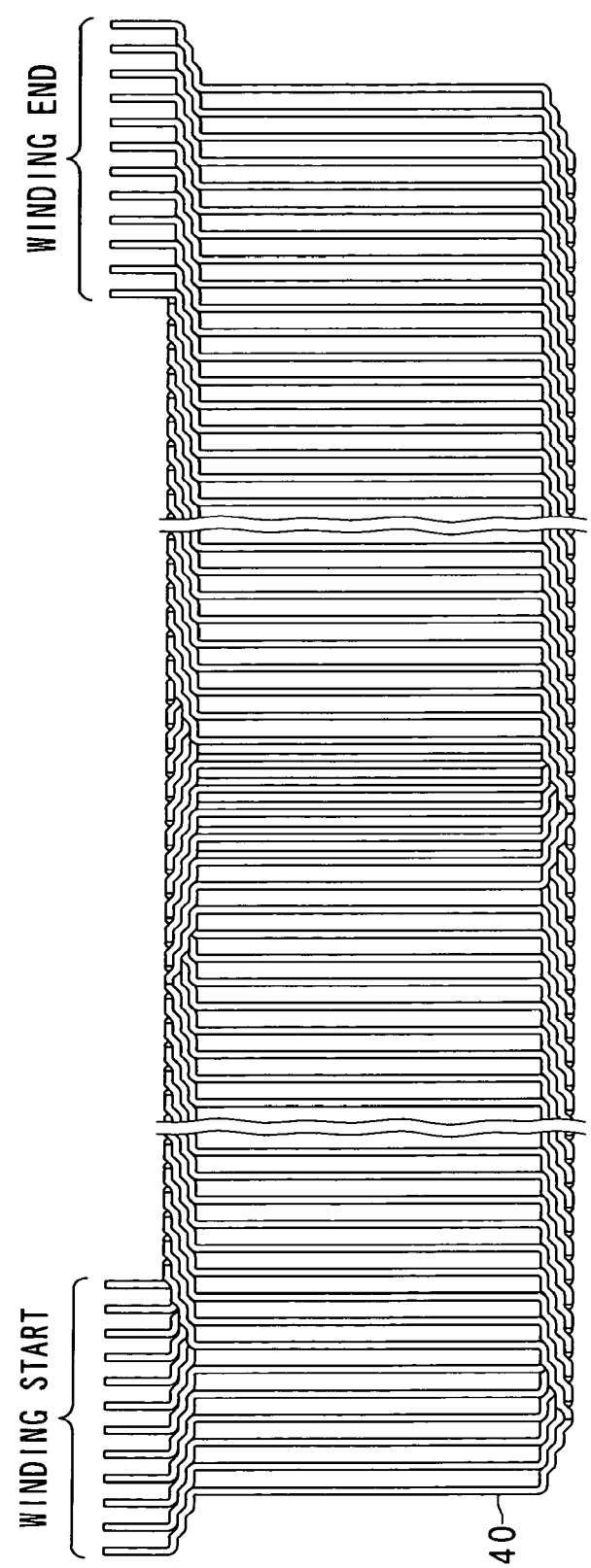
FIG. 15 is an illustration of a plastic body of stator windings forming a coil in a rotary electric machine according to a comparative example.
Figure 16:
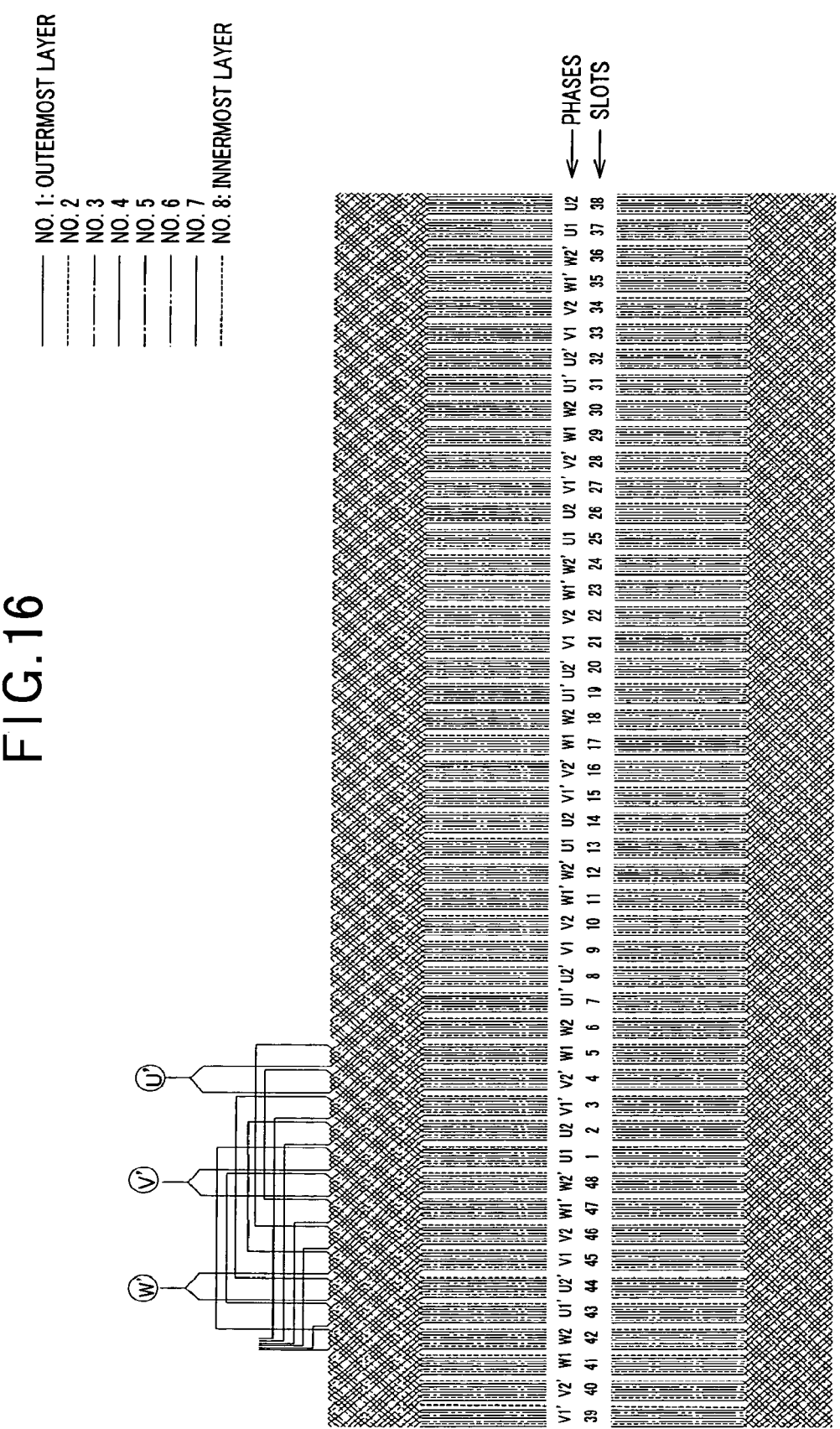
FIG. 16 is an illustration of wire connection of phase windings of the coil in the rotary electric machine according to the comparative example.
Figure 17:
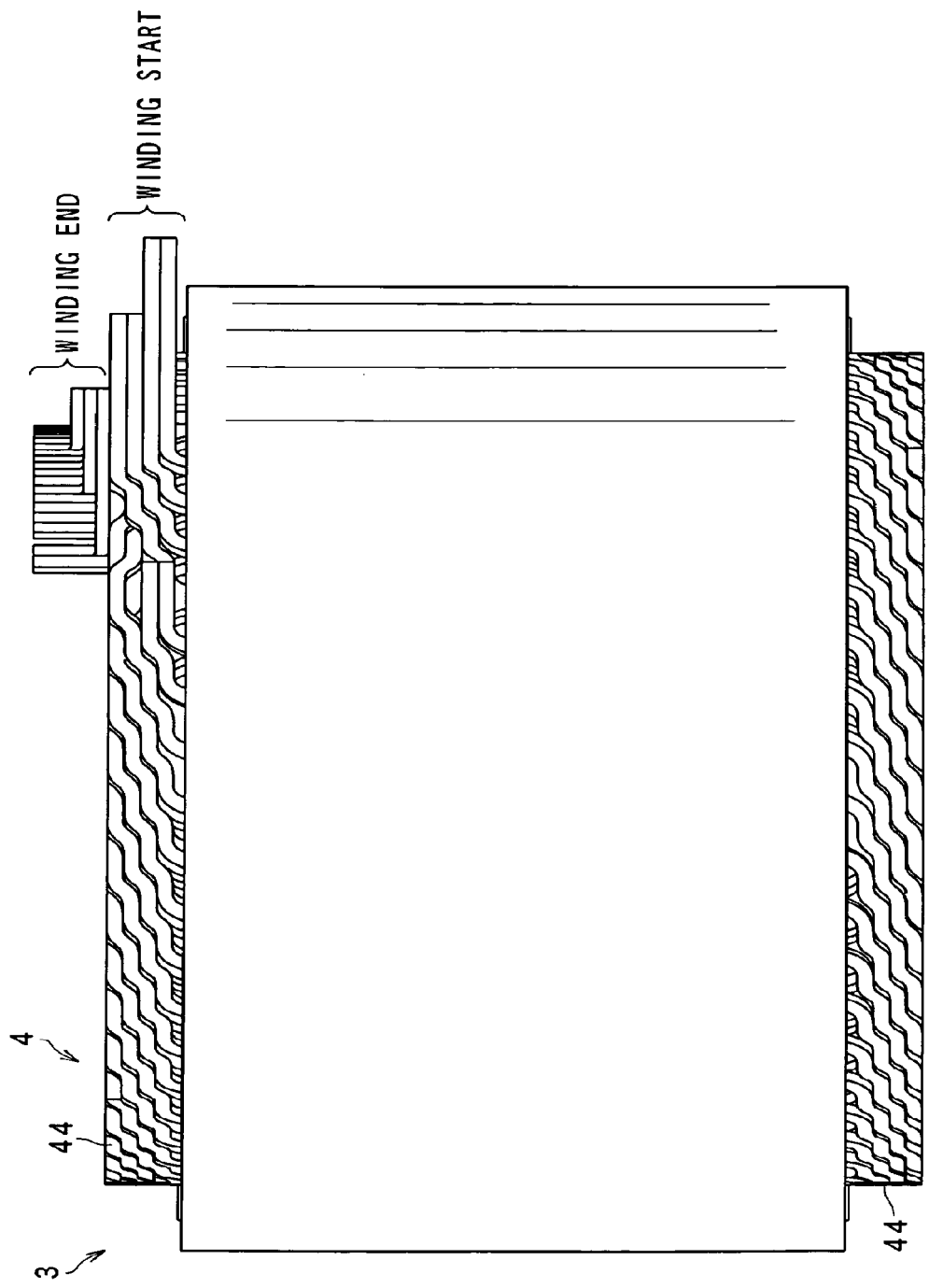
FIG. 17 is a side elevation of the stator in the rotary electric machine according to the comparative example.

In the embodiment described above, the two winding wires 40a, 40b forming each of the phases are joined to each other. On the other hand, the coil 4 of the present comparative example is formed using two windings which are not joined to each other. FIGS. 15 to 17 show a method of winding such windings of the present comparative example.

As shown in a development of FIG. 15, one ends and the other ends (winding-start ends and winding-end ends) of the wire members 40 configuring the coil 4 are located on the sides of both surfaces, i.e. on the sides of the inner and outer peripheral surfaces, respectively, of the coil 4. In order to establish connection of the end (winding-end end) of each wire member 40 at the innermost peripheral surface of the coil 4, it is necessary to route this end (winding-end end) crossing over the coil end.

As in the present comparative example, the larger number of the wire members 40 necessitates the routing of the winding-end ends to be cumbersome, and thus the cost for manufacturing the coil 4 will be much increased. FIG. 16 shows an example of routing the winding-end ends. The connecting method of each of the wire member used in FIG. 16 is the same as the one used in FIG. 8.

Further, as shown in FIG. 17, permitting the winding-end ends to project from the innermost layer (position "No. 8" of the associated slots) of the coil 4 necessitates the winding-end ends to cross over the coil end, for connection. As a result of the routing of these winding-end ends, the size of the coil end is increased to increase the size of the entire coil.

In this regard, in the stator 3 of the rotary electric machine 1 according to the embodiment described above, the first and second windings 40a, 40b configuring the coil 4 are joined to each other at the return portion 46. This can provide a configuration in which the winding-end ends of the joined wire bodies formed of two winding wires 40a, 40b are prevented from projecting out of the coil end. In other words, the stator 3 of the rotary electric machine 1 according to the above embodiment is configured to reduce the size of the coil 4.

As described above, the stator 3 of the rotary electric machine 1 according to the above embodiment is configured to reduce its size without deteriorating the good performance.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A stator for a multiple-phase rotary electric machine, the stator facing a rotor, the stator comprising:
   a stator core formed into a cylinder having an axial direction, a radial direction, and a circumferential direction and formed to have a plurality of slots each extending in the axial direction and arranged in the circumferential direction; and
   a coil formed of a plurality of windings for individual phases, the windings being wound in and around the respective plurality of slots,
   wherein the winding for each phase has a plurality of slot-accommodated portions accommodated respectively in slots designated therefor among said plurality of slots and a plurality of turn portions each connecting mutually adjacently located two of the slot-accommodated portions thereof, outside of the slots in the axial direction, the slot-accommodated portions including a return portion that connects two of the turn portions so that the winding for each phase reverses a winding direction thereof in the circumferential direction,
   wherein the winding for each phase has a first winding and a second winding electrically connected in series to each other, the slot-accommodated portions of the first and second windings being alternately stacked in each of said slots designated therefor in the radial direction, the designated slots being located every predetermined number of slots among the plurality of slots in the circumferential direction,
   the return portion of the winding for each phase has a joined portion having both ends connected to said two turn portions, respectively, one of the two turn portions, which is connected to one of the ends of the return portion, being connected to one mutually adjacently located slot-accommodated portion accommodated at the same level as an in-slot level of the return portion in the radial direction, and the other of the two turn portions, which is connected to the other of the ends of the return portion, being connected to another mutually adjacently located slot-accommodated portion accommodated at a different level from the in-slot level of the return portion in the radial direction, and
   the joined portion is disposed in a predetermined designated slot among the designated slots so that the winding reverses the winding direction thereof at the predetermined designated slot.

2. The stator of claim 1, wherein the return portion of the winding for each phase is located at an innermost position of the respective predetermined designated slot in the radial direction.

3. The stator of claim 2, wherein the winding for each phase is composed of a wire member comprising a metal conductor whose section shape across a length-wise direction thereof is substantially rectangular and an insulative resin film covering the conductor, and the joined portion is formed as a welded portion at which the conductors of the first and second windings are welded to each other.

4. The stator of claim 2, wherein the welded portion is covered with an insulating resin member.

5. The stator of claim 2, wherein each of the turn portions is cranked in the circumferential direction.

6. The stator of claim 2, wherein each of the turn portions is shaped into a staircase form whose circumferential central part is protruded from an axial end of the stator core and is the highest in the axial direction.

7. The stator of claim 6, wherein the central part has a height corresponding to a thickness of the winding for each phase.

8. The stator of claim 2, wherein the slot-accommodated portions of the winding for each phase are juxtaposed in each slot in the radial direction.

9. The stator of claim 2, wherein the winding for each phase has both ends located at an outermost position in each of the slots in the radial direction, and the position of both ends of the winding for each phase is lower than a height of the turn portions protruded from an axial end of the stator core in the radial direction.

10. The stator of claim 2, wherein the winding for each phase is composed of a wire member comprising a metal conductor whose section shape across a length-wise direction thereof is substantially rectangular and an insulative resin film covering the conductor, and
the joined portion is formed as a welded portion at which the conductors of the first and second windings are welded to each other.

11. The stator of claim 10, wherein the welded portion is covered with an insulating resin member.

12. The stator of claim 11, wherein each of the turn portions is cranked in the circumferential direction.

13. The stator of claim 12, wherein each of the turn portions is shaped into a staircase form whose circumferential central part is protruded from an axial end of the stator core and is the highest in the axial direction.

14. The stator of claim 13, wherein the central part has a height corresponding to a thickness of the winding for each phase.

15. The stator of claim 14, wherein the slot-accommodated portions of the winding for each phase are stacked on one another in each of the slots designated therefor in the radial direction.

16. The stator of claim 15, wherein the return portion is located at an innermost position of the respective predetermined designated slot in the radial direction.

17. A rotary electric machine comprising:
a rotor; and
a stator having multiple phases and facing the rotor,
wherein the stator comprises:
a stator core formed into a cylinder having an axial direction, a radial direction, and a circumferential direction and formed to have a plurality of slots each extending in the axial direction and arranged in the circumferential direction; and
a coil formed of a plurality of windings for individual phases of the machine, the windings being wound in and around the respective plurality of slots,
wherein the winding for each phase has a plurality of slot-accommodated portions accommodated respectively in slots designated therefor among said plurality of slots and a plurality of turn portions each connecting mutually adjacently located two of the slot-accommodated portions thereof, outside of the slots in the axial direction, the slot-accommodated portions including a return portion that connects two of the turn portions so that the winding for each phase reverses a winding direction thereof in the circumferential direction,
wherein the winding for each phase has a first winding and a second winding electrically connected in series to each other, the slot-accommodated portions of the first and second windings being alternately stacked in each of said slots designated therefor in the radial direction, the designated slots being located every predetermined number of slots among the plurality of slots in the circumferential direction,
the return portion of the winding for each phase has a joined portion having both ends connected to the two turn portions, respectively, one of the two turn portions, which is connected to the one of the ends of the return portion, being connected to one mutually adjacently located slot-accommodated portion accommodated at the same level as an in-slot level of the return portion in the radial direction, and the other of the two turn portions, which is connected to the other of the ends of the return portion, being connected to another mutually adjacently located slot-accommodated portion accommodated at a different level from the in-slot level of the return portion in the radial direction, and
the joined portion is disposed in a predetermined designated slot among the designated slots so that the winding reverses the winding direction thereof at the predetermined designated slot, and
wherein the rotor is provided with N and S magnetic poles arranged alternately in the circumferential direction and arranged to face the stator, the rotor being located either inside or outside of the stator in the radial direction.

18. The rotary electric machine of claim 17, wherein the return portion of the winding for each phase is located at an innermost position of the respective predetermined designated slot in the radial direction.

19. The rotary electric machine of claim 18, wherein the winding for each phase is composed of a wire member comprising a metal conductor whose section shape across a length-wise direction thereof is substantially rectangular and an insulative resin film covering the conductor, and
the joined portion is formed as a welded portion at which the conductors of the first and second windings are welded to each other.

* * * * *